April 8, 1924.

G. C. KENNEDY

HEATER FOR MOTOR VEHICLE RADIATORS

Filed April 24, 1922

1,489,834

Inventor.
George Colvin Kennedy

Patented Apr. 8, 1924.

1,489,834

UNITED STATES PATENT OFFICE.

GEORGE COLVIN KENNEDY, OF WATERLOO, IOWA.

HEATER FOR MOTOR-VEHICLE RADIATORS.

Application filed April 24, 1922. Serial No. 556,273.

*To all whom it may concern:*

Be it known that I, GEORGE COLVIN KENNEDY, a citizen of the United States of America, and a resident of Waterloo, Blackhawk County, Iowa, have invented certain new and useful Improvements in Heaters for Motor-Vehicle Radiators, of which the following is a specification.

My invention relates to improvements in heaters for motor-vehicle radiators and the like, and the object of my improvement is to supply a compact, collapsible and adjustable, and inexpensive heater easily mounted upon a radiator, and when collapsed together occupying only a restricted space.

Figure 1:
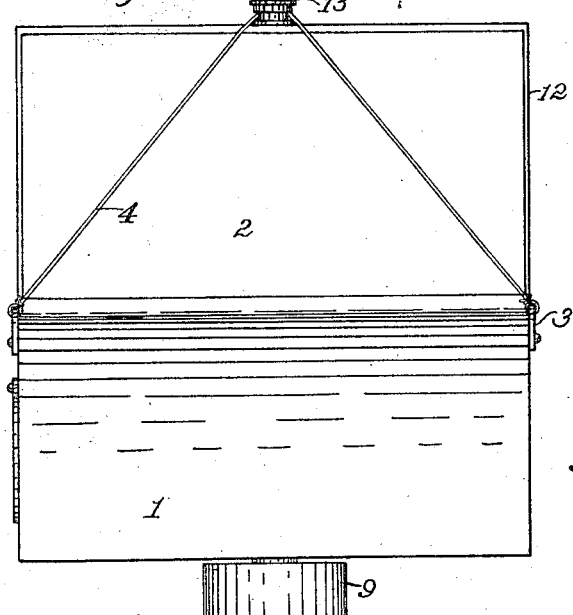
Figure 2:
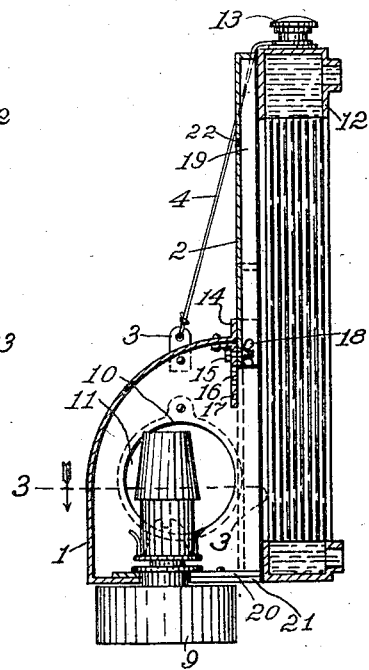
Figure 3:
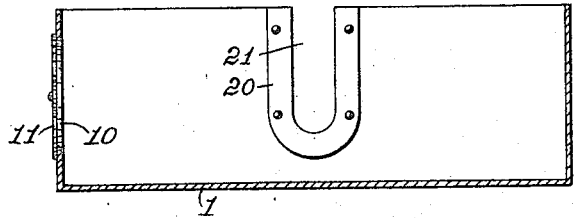
Figure 4:
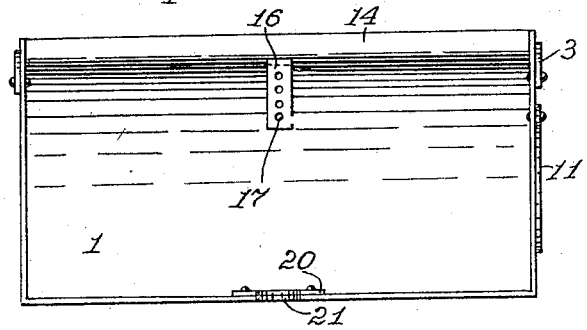

This object I have accomplished by the means which are hereinafter described and claimed, and which are illustrated in the accompanying drawings, in which Fig. 1 is a front elevation of my improved heater as extended adjustably and removably mounted across the front of a motor-vehicle radiator. Fig. 2 is a medial vertical cross-section of both the collapsible housing and of the radiator, the lamp being shown in elevation. Fig. 3 is a horizontal section of the lower element of said housing taken on the broken line 3—3 of said Fig. 2, and Fig. 4 is a rear elevation of said lower element only.

Similar numerals of reference designate similar parts throughout the several views.

The numeral 12 denotes an automobile radiator of an ordinary type having top and bottom water tanks connected by a series of vertical tubular risers, the tanks being in communication respectively with the water-jacket of an internal-combustion motor of the vehicle, which with the connections are not shown.

My device includes an adjustable collapsible or knockdown housing comprising a lower part or element 1 and an upper part 2 which are slidingly assembled together. The lower part 1 is closed all around except at the rear which is open. this open rear end being positioned and closed by the front of the radiator 12 when hung thereon.

On the end walls of the top part of said housing element 1 are fixed short standards 3 orificed to receive ends of a wire 4 forming a loop for suspending the heater in equilibrium on the radiator, the loop passing about the top water-inlet nipple 13. In the bottom of the part 1 is a recess 21, and a horse-shoe shaped reinforcing bar 20 is riveted upon the bottom plate to have its inner edge register with the inner edge of the recess. A heating lamp 9 is provided, and its neck has an annular flange which rests upon the bar 20 when said neck has been inserted in said recess, whereby the lamp is supported medially of the housing with its fount below and its burner and short chimney within the housing.

In one end of the housing part 1 is an opening 10 covered by a swinging closure-plate 11 which is pivoted at its top to the housing, this provides means for insertion of an arm to regulate the burner, as also to permit visible inspection thereof when desired, any other heating means may be used to heat the air in said housing.

This housing part 1 is preferably positioned to cover the lower tank and the lower part only of the radiator, in which the water part is usually colder than at the top. However, in order to subject the top part of the radiator and the upper tank to the heating process, I have supplied the upper part 2 of the housing which may be projected upwardly adjustably to fit over radiators of varying heights. This part 2 is a flat plate of metal having a top flange and side flanges of little depth, but there is no such flange provided at the bottom. The top of the lower housing element 1 may be sloped or curved as shown, and its rear edge is bent upwardly at 14 providing a stiffening member and contact plate, as the housing part 2 is slidably mounted in the relatively shallow seating cavity thus provided between the rear edges of the part 2, closely fitting these and the rear face of the flange 14.

The numeral 16 denotes a depending bar fixed at the middle of the under side of the hood part of the element 1, and has a longitudinal row of bolt-holes 17 to receive a bolt 15 which also traverses a hole in the lower part of the element 2 and is secured by means of a wing-nut 18. Another hole may be provided in the upper part of said element 2 to take said bolt when the part 2 is collapsed as shown by the dotted lines in Fig. 2, whereby the parts 1 and 2 are secured together in their collapsed condition for storage or transportation.

The flanges 19 of the part 2 engage at their rear edges the front of the radiator, while the bottom of the part 1 extends a like distance rearwardly to likewise engage the radiator, thus sufficiently providing a closed joint all around, so that heated air may cover the front of the radiator and also traverse its interstices to enter and warm its connecting pipes and the water in the motor jacket under the hood. Enough of an air-port is left of the bottom groove 21 to supply the lamp burner within the part 1.

The housing parts 1 and 2 may be adjustably secured together by any suitable means.

Having described my invention, what I claim as new and desire to secure by Letters Patent, is:

1. In combination, a hollow casing member open along one side for apposition to an apertured face of a radiator structure, a shallower casing member adjustably mounted and releasably secured to the first-mentioned member to be moved in one plane to and fro relative thereto and to the radiator to either serve as a closure for said member when collapsed upon it or to serve as a shallow extension for said member when extended, the members cooperating to enclose said radiator face in the latter relation, and temperature-changing means positioned within the first mentioned member.

2. In combination, a hollow casing member open along one side for apposition to an apertured face of a radiator structure, a shallower casing member adjustably mounted and releasably secured to the first-mentioned member to be moved in one plane to and fro relative thereto and to the radiator to either serve as a closure for said member when collapsed upon it or to serve as a shallow extension for said member when extended, the members cooperating to enclose the radiator face in the latter relation and being in communication with each other, said casing having an inspection-opening, a closure movably closing said opening, and temperature-changing means positioned within the casing.

Signed at Waterloo, Iowa, this 25th day of March, 1922.

GEORGE COLVIN KENNEDY.